United States Patent
Lee et al.

(10) Patent No.: US 12,382,294 B2
(45) Date of Patent: Aug. 5, 2025

(54) SECURE COMMUNICATION LINK ESTABLISHMENT FOR A UE-TO-UE RELAY

(71) Applicant: QUALCOMM Incorporated, San Diego, CA (US)

(72) Inventors: Soo Bum Lee, San Diego, CA (US); Adrian Edward Escott, Reading (GB); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 17/491,371

(22) Filed: Sep. 30, 2021

(65) Prior Publication Data

US 2022/0109996 A1    Apr. 7, 2022

Related U.S. Application Data

(60) Provisional application No. 63/086,560, filed on Oct. 1, 2020.

(51) Int. Cl.
*H04W 12/50* (2021.01)
*H04W 8/00* (2009.01)
(Continued)

(52) U.S. Cl.
CPC .......... *H04W 12/50* (2021.01); *H04W 8/005* (2013.01); *H04W 12/0431* (2021.01);
(Continued)

(58) Field of Classification Search
CPC ......... H04W 12/0433; H04W 12/0431; H04W 76/14; H04W 8/005; H04W 92/18
(Continued)

(56) References Cited

U.S. PATENT DOCUMENTS 10,021,570 B1 *   7/2018   Cai ........................ H04W 48/18
10,534,932 B2 *   1/2020   Wang ...................... H04W 4/02
(Continued)

FOREIGN PATENT DOCUMENTS

EP     1881664 A1 *   1/2008   ......... H04L 63/0853
JP     7010227 B2 *   1/2022   ............. H04W 4/06
(Continued)

OTHER PUBLICATIONS

Panton, Tim, David Llewellyn-Jones, Nathan Shone, and Mahmoud Hashem Eiza. "Secure proximity-based identity pairing using an untrusted signalling service." In 2016 13th IEEE Annual Consumer Communications & Networking Conference (CCNC), pp. 942-947. IEEE, 2016. (Year: 2016).*

(Continued)

*Primary Examiner* — Luu T Pham
*Assistant Examiner* — Walter J Malinowski
(74) *Attorney, Agent, or Firm* — Loza & Loza, LLP

(57) ABSTRACT

Aspects relate to user equipment (UE) to user equipment (UE-to-UE) relaying in a communication system. At least two remote UEs and a UE-to-UE relay receive provisioned security information from the wireless communication network, where the security information includes discovery parameters and relay security information. The security information provisioned by the wireless communication network is used to establish a connection between the two UEs and the UE-to-UE relay device including discovery of the UE-to-UE relay by the remote UEs. Furthermore, the provisioned security information is used to establish a secure connection between the two remote UEs via the UE-to-UE relay device.

23 Claims, 10 Drawing Sheets

(51) Int. Cl.
*H04W 12/0431* (2021.01)
*H04W 12/0433* (2021.01)
*H04W 76/14* (2018.01)
*H04W 92/18* (2009.01)

(52) U.S. Cl.
CPC ....... *H04W 12/0433* (2021.01); *H04W 76/14* (2018.02); *H04W 92/18* (2013.01)

(58) Field of Classification Search
USPC .......................................................... 726/2
See application file for complete search history.

(56) References Cited

U.S. PATENT DOCUMENTS

| | | | | |
|---|---|---|---|---|
| 11,924,184 | B2 * | 3/2024 | Guo | H04L 9/14 |
| 2013/0138822 | A1 * | 5/2013 | Hu | H04L 67/146 |
| | | | | 709/227 |
| 2014/0337935 | A1 * | 11/2014 | Liu | H04L 63/10 |
| | | | | 726/4 |
| 2016/0029213 | A1 * | 1/2016 | Rajadurai | H04L 63/068 |
| | | | | 380/283 |
| 2016/0135016 | A1 * | 5/2016 | Zou | H04W 72/23 |
| | | | | 370/312 |
| 2016/0155327 | A1 * | 6/2016 | Schlienz | B61L 29/18 |
| | | | | 340/907 |
| 2016/0205532 | A1 * | 7/2016 | Chen | H04W 48/16 |
| | | | | 370/328 |
| 2016/0205555 | A1 * | 7/2016 | Agiwal | H04W 12/03 |
| | | | | 713/168 |
| 2016/0295496 | A1 * | 10/2016 | Atarius | H04W 40/246 |
| 2017/0041366 | A1 * | 2/2017 | Dowlatkhah | H04L 67/561 |
| 2017/0041768 | A1 * | 2/2017 | Pattan | H04L 61/103 |
| 2017/0055149 | A1 * | 2/2017 | Lehtovirta | H04W 12/0431 |
| 2017/0118637 | A1 * | 4/2017 | Peng | H04L 63/205 |
| 2017/0295531 | A1 * | 10/2017 | Singh | H04W 8/08 |
| 2017/0359766 | A1 * | 12/2017 | Agiwal | H04L 5/0048 |
| 2018/0007612 | A1 * | 1/2018 | Jahangir | H04L 61/503 |
| 2018/0234862 | A1 * | 8/2018 | Lee | H04W 88/04 |
| 2019/0239147 | A1 * | 8/2019 | Chun | H04W 88/06 |
| 2021/0368581 | A1 * | 11/2021 | Shan | H04W 8/24 |
| 2021/0410215 | A1 * | 12/2021 | Kuo | H04W 76/14 |
| 2023/0082590 | A1 * | 3/2023 | Peng | H04B 17/318 |
| | | | | 455/7 |
| 2023/0254692 | A1 * | 8/2023 | Kim | H04W 12/61 |
| | | | | 726/6 |
| 2023/0269802 | A1 * | 8/2023 | Fu | H04W 76/11 |
| | | | | 455/500 |

FOREIGN PATENT DOCUMENTS

| | | | | |
|---|---|---|---|---|
| KR | 20210028549 | A * | 3/2021 | |
| WO | WO-2016116704 | A1 * | 7/2016 | H04L 67/04 |
| WO | WO-2019134868 | A1 | 7/2019 | |
| WO | WO-2022032506 | A1 * | 2/2022 | |
| WO | WO-2022034540 | A1 * | 2/2022 | H04W 76/11 |

OTHER PUBLICATIONS

Alam, Muhammad, Du Yang, Jonathan Rodriguez, and Raed A. Abd-Alhameed. "Secure device-to-device communication in LTE-A." IEEE Communications Magazine 52, No. 4 (2014): 66-73. (Year: 2014).*

ETSI, TS. "123 287: V16. 3.0 (Jul. 2020). 5G." Architecture enhancements for 5G System (5GS) to support Vehicle-to-Everything (V2X) services (3GPP TS 23.287 version 16.3. 0 Release 16). (Year: 2020).*

Kozioł, Dawid, Fernando Sanchez Moya, Ling Yu, Vinh Van Phan, and Steven Xu. "QoS and service continuity in 3GPP D2D for IoT and wearables." In 2017 IEEE Conference on Standards for Communications and Networking (CSCN), pp. 233-239. IEEE, 2017. (Year: 2017).*

Conceição, Filipe, Nouha Oualha, and Djamal Zeghlache. "Real-Time Dynamic Security for ProSe in 5G." In 2019 2nd International Conference on Signal Processing and Information Security (ICSPIS), pp. 1-4. IEEE, 2019. (Year: 2019).*

Raghothaman, Balaji, Eric Deng, Ravikumar Pragada, Gregory Sternberg, Tao Deng, and Kiran Vanganuru. "Architecture and protocols for LTE-based device to device communication." In 2013 International Conference on Computing, Networking and Communications (ICNC), pp. 895-899. IEEE, 2013. (Year: 2013)*

"3rd Generation Partnership Project, Technical Specification Group Services and System Aspects, Procedures for the SG System (SGS), Stage 2 (Release 16) ", 3GPP Draft, 23502-G60, 3rd Generation Partnership Project (3GPP), Mobile Competence Centre, 650, Route Des Lucioles, F-06921 Sophia-Antipolis Cedex, France, Sep. 24, 2020 (Sep. 24, 2020), XP051935528, pp. 1-597, Retrieved from the Internet: URL: https://ftp.3gpp.org/3guInternal/3GPP_ultimate_versions_to_be_transposed/sentToDpc/23502-g60.zip 23502-g60. docx [retrieved on Sep. 24, 2020] p. 65, Line 27—p. 70, Line 36.

"3rd Generation Partnership Project, Technical Specification Group Services and System Aspects, Study on System Enhancement for Proximity Based Services (ProSe) in the 5G System (5GS) (Release 17)", 3GPP Draft, 23752-050, 3rd Generation Partnership Project (3GPP), Mobile Competence Centre, 650, Route Des Lucioles, F-06921 Sophia-Antipolis Cedex, France, Sep. 9, 2020 (Sep. 9, 2020), XP051933331, pp. 1-162, Retrieved from the Internet: URL: https://ftp.3gpp.org/tsg_sa/WG2_Arch/Latest_SA2_Specs/Latest_draft_S2_Specs/23752-050.zip 23752-050_MCCclean.docx [retrieved on Sep. 9, 2020] p. 46, Line 9—p. 60, Line 17 p. 114, Line 22—p. 117, Last Line p. 142, Line 27—p. 147, Line 26.

International Search Report and Written Opinion—PCT/US2021/053249—ISA/EPO—Jan. 25, 2022.

"Universal Mobile Telecommunications System (UMTS), LTE, Proximity-Based Services (ProSe), Security aspects (3GPP TS 33.303 Version 16.0.0 Release 16)", ETSI Technical Specification, European Telecommunications Standards Institute (ETSI), 650, Route Des Lucioles, F-06921 Sophia-Antipolis, France, vol. 3GPP SA, No. V16.0.0 Aug. 10, 2020 (Aug. 10, 2020), XP014380020, pp. 1-92, Retrieved from the Internet: URL: http://www.etsi.org/deliver/etsi_ts/133300_133399/133303/16.00.00_60/ts_133303v160000p. pdf [retrieved on Aug. 10, 2020] p. 51, Line 10—p. 64, Line 3.

* cited by examiner

SECURE COMMUNICATION LINK ESTABLISHMENT FOR A UE-TO-UE RELAY

CROSS REFERENCE TO RELATED APPLICATIONS

This application claims priority to and the benefit of U.S. Provisional Application No. 63/086,560 filed in the U.S. Patent and Trademark Office on Oct. 1, 2020, the entire contents of which are incorporated herein by reference as if fully set forth below in its entirety and for all applicable purposes.

TECHNICAL FIELD

The technology discussed below relates generally to wireless communication networks, and more particularly, to solution for secure communication link establishment for a UE-to-UE relay.

BACKGROUND

Wireless communication between devices may be facilitated by various network configurations. In one configuration, a wireless network may enable wireless communication devices (e.g., user equipment (UEs)) to communicate directly with one another via a sidelink such as a PC5 interface. The connection setup for such sidelinks employ a proximity-based services (ProSe) key management function (PKMF) and a 5G direct discovery name management function (DDNMF).

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In an aspect, a method for wireless communication at a user equipment (UE) in a wireless communication network is disclosed. The method includes receiving security information from the wireless communication network, wherein the security information includes discovery parameters and relay security information. Further, the method includes establishing a connection with a user equipment to a user equipment (UE-to-UE) relay device using the received security information, and establishing a secure connection with at least a second UE via the UE-to-UE relay device using the received security information.

According to other aspects, a user equipment (UE) in a wireless communication system is disclosed that includes a wireless transceiver, a memory, and a processor communicatively coupled to the wireless transceiver and the memory. The processor and the memory are configured to receive security information from the wireless communication network, wherein the security information includes discovery parameters and relay security information, establish a connection with a user equipment to user equipment (UE-to-UE) relay device using the received security information, and establish a secure connection with at least a second UE via the UE-to-UE relay device using the received security information.

In yet other aspects, a method for wireless communication in a user equipment (UE) to UE (UE-to-UE) relay in a wireless communication network is disclosed. The method includes receiving security information from the wireless communication network, wherein the security information includes discovery parameters and relay security information. Further, the method includes establishing secure communication links with at least a first user equipment (UE) and a second UE based on the received security information.

In still further aspects, a UE-to-UE relay in a wireless communication system is disclosed having a wireless transceiver, a memory, and a processor communicatively coupled to the wireless transceiver and the memory. The processor and the memory are configured to receive security information from the wireless communication network, wherein the security information includes discovery parameters and relay security information, and establish secure communication links with at least a first user equipment (UE) and a second UE based on the received security information.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

Figure 1:
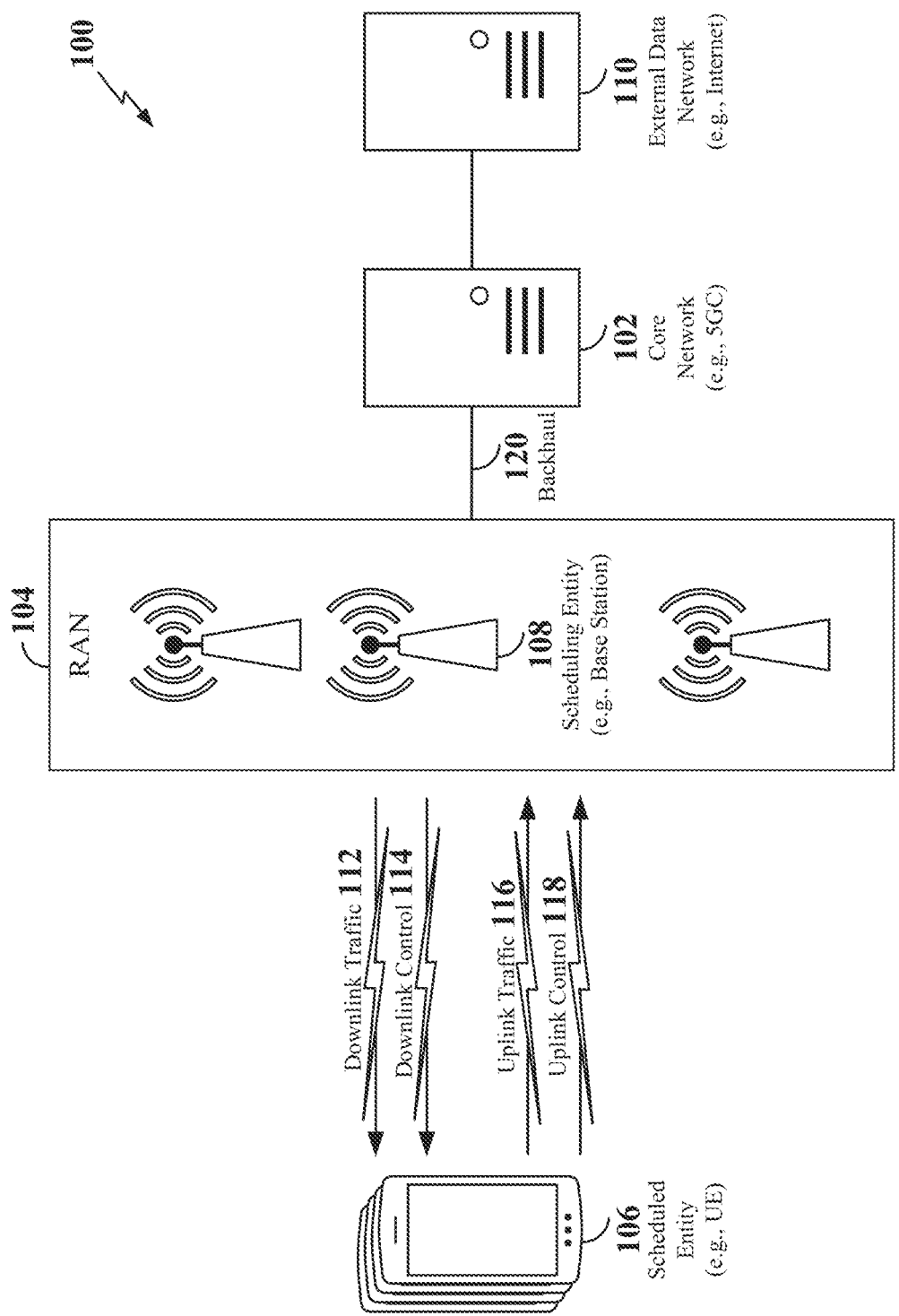
FIG. 1 is an illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Various aspects of the disclosure relate to user equipment (UE) to user equipment (UE-to-UE) relaying in a communication system. In some aspects, the disclosure relates to at least two remote UEs and a UE-to-UE relay receiving provisioned security information from the wireless communication network, where the security information includes discovery parameters and relay security information. The security information provisioned by the wireless communication network may be used to establish a connection between the two UEs and the UE-to-UE relay device including discovery of the UE-to-UE relay by the remote UEs. Furthermore, the provisioned security information may be used to establish a secure connection between the two remote UEs via the UE-to-UE relay device.

The various concepts presented throughout this disclosure may be implemented across a broad variety of telecommunication systems, network architectures, and communication standards. FIG. 1 illustrates various aspects with reference to a schematic of a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications. As another example, the RAN 104 may operate under a hybrid of 5G NR and Evolved Universal Terrestrial Radio Access Network (eUTRAN) standards, often referred to as LTE, such as in non-standalone (NSA) systems including EN-DC systems. The 3GPP also refers to this hybrid RAN as a next-generation RAN, or NG-RAN. Additionally, many other examples may be utilized within the scope of the present disclosure.

As illustrated in FIG. 1, the RAN 104 includes a plurality of base stations 108. In different technologies, standards, or contexts, the base stations 108 may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Wireless communication between the RAN 104 and a UE 106 may be described as utilizing an air interface. Transmissions over the air interface from a base station (e.g., base station 108) to a UE (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UE 106, which may be a scheduled entity, may utilize resources allocated by the scheduling entity 108.

As illustrated in FIG. 1, a base station or scheduling entity 108 may broadcast downlink traffic 112 to one or more UEs (e.g., UE 106). Broadly, the base station or scheduling entity 108 may be configured as a node or device responsible for scheduling traffic in a wireless communication network, including the downlink traffic 112 and, in some examples, uplink traffic 116 from the UE 106 to the scheduling entity 108. The UE 106 may be configured as a node or device that also receives downlink control information 114, including but not limited to scheduling information (e.g., a grant), synchronization or timing information, or other control information from another entity in the wireless communication network such as the scheduling entity 108. Furthermore, the UE 106 may send uplink control information 118 to the base station 108 including but not limited to scheduling information (e.g., grants), synchronization or timing information, or other control information.

In general, base stations 108 may include a backhaul interface for communication with a backhaul portion 120 of the wireless communication system. The backhaul 120 may provide a link between a base station 108 and the core network 102. Further, in some examples, a backhaul interface may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UE 106, which may be a scheduled entity, may utilize resources allocated by the base station or scheduling entity 108.

Figure 2:
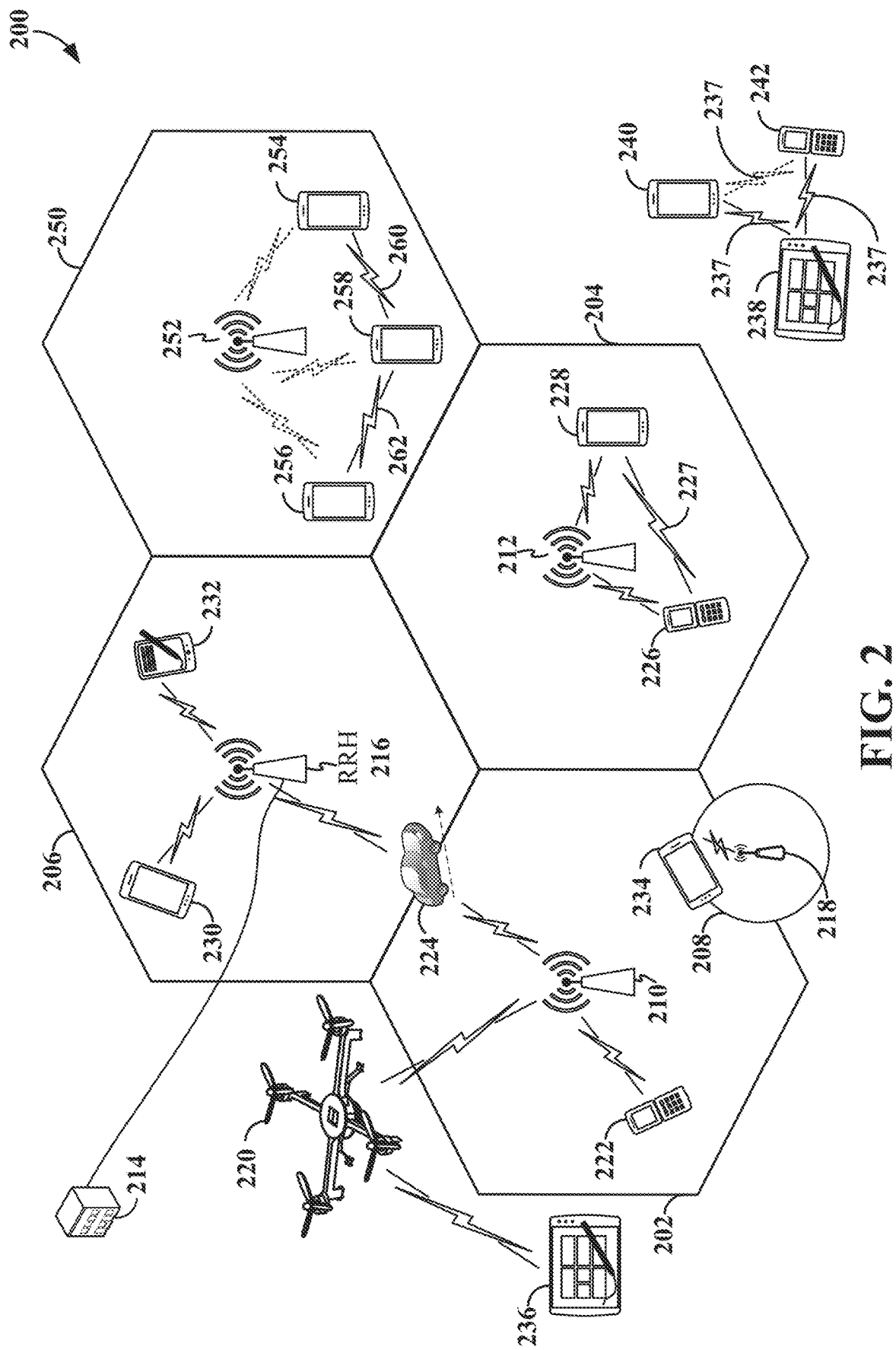
FIG. 2 is an illustration of an example of a radio access network according to some aspects.

Referring now to FIG. 2, by way of example and without limitation, an illustration of a RAN 200 is provided. The RAN 200 may implement any suitable wireless communication technology or technologies to provide radio access. As one example, the RAN 200 may operate according to 3rd Generation Partnership Project (3GPP) New Radio (NR) specifications, often referred to as 5G. As another example, the RAN 200 may operate under a hybrid of 5G NR and Evolved Universal Terrestrial Radio Access Network (eU-TRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 200 may be divided into a number of cellular regions (cells) that can be uniquely identified by a user equipment (UE) based on an identification broadcasted over a geographical area from one access point or base station. FIG. 2 illustrates cells 202, 204, 206, and cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 200 operates according to both the LTE and 5G NR standards, one of the base stations may be an LTE base station, while another base station may be a 5G NR base station.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208 which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station such as the UAV 220.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 200 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

For purposes of the present application, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 200, the cells may include UEs that may be in communication with one or more sectors of each cell. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. Here, each base station 210, 212, 214, 218, and 220 may be configured to provide an access point to a core network (not shown) for all the UEs in the respective cells. In some examples, the UAV 220 (e.g., the quadcopter) can be a mobile network node and may be configured to function as a UE. For example, the UAV 220 may operate within cell 202 by communicating with base station 210.

Wireless communication between a RAN 200 and a UE (e.g., UE 222 or 224) may be described as utilizing an air interface. Transmissions over the air interface from a base station (e.g., base station 210) to one or more UEs (e.g., UE 222 and 224) may be referred to as downlink (DL) transmission. In accordance with certain aspects of the present disclosure, the term downlink may refer to a point-to-multipoint transmission originating at a scheduling entity (described further below; e.g., base station 210). Another way to describe this scheme may be to use the term broadcast channel multiplexing. Transmissions from a UE (e.g., UE 222) to a base station (e.g., base station 210) may be referred to as uplink (UL) transmissions. In accordance with further aspects of the present disclosure, the term uplink may refer to a point-to-point transmission originating at a scheduled entity (described further below; e.g., UE 222).

For example, DL transmissions may include unicast or broadcast transmissions of control information and/or traffic information (e.g., user data traffic) from a base station (e.g., base station 210) to one or more UEs (e.g., UEs 222 and 224), while UL transmissions may include transmissions of control information and/or traffic information originating at a UE (e.g., UE 222). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In another example of sidelink communication, a cell 250 includes a base station, gNB, or RRH 252. Additionally, a UE 254 and UE 256 may be configured to communicate via a UE-to-UE relay device 258 that wirelessly links the UEs 254 and 256. In an example, the UE-to-UE relay device 258 may be a UE or similar mobile device. The UE-to-UE relay 258 is wirelessly linked via sidelink signaling 260 and 262, which may be a PC5 link or similar link.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 200 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 200 may utilize one or more multiplexing and multiple access algorithms to enable simultaneous communication of the various devices. For example, 5G NR specifications provide multiple access for UL or reverse link transmissions from UEs 222 and 224 to base station 210, and for multiplexing DL or forward link transmissions from the base station 210 to UEs 222 and 224 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
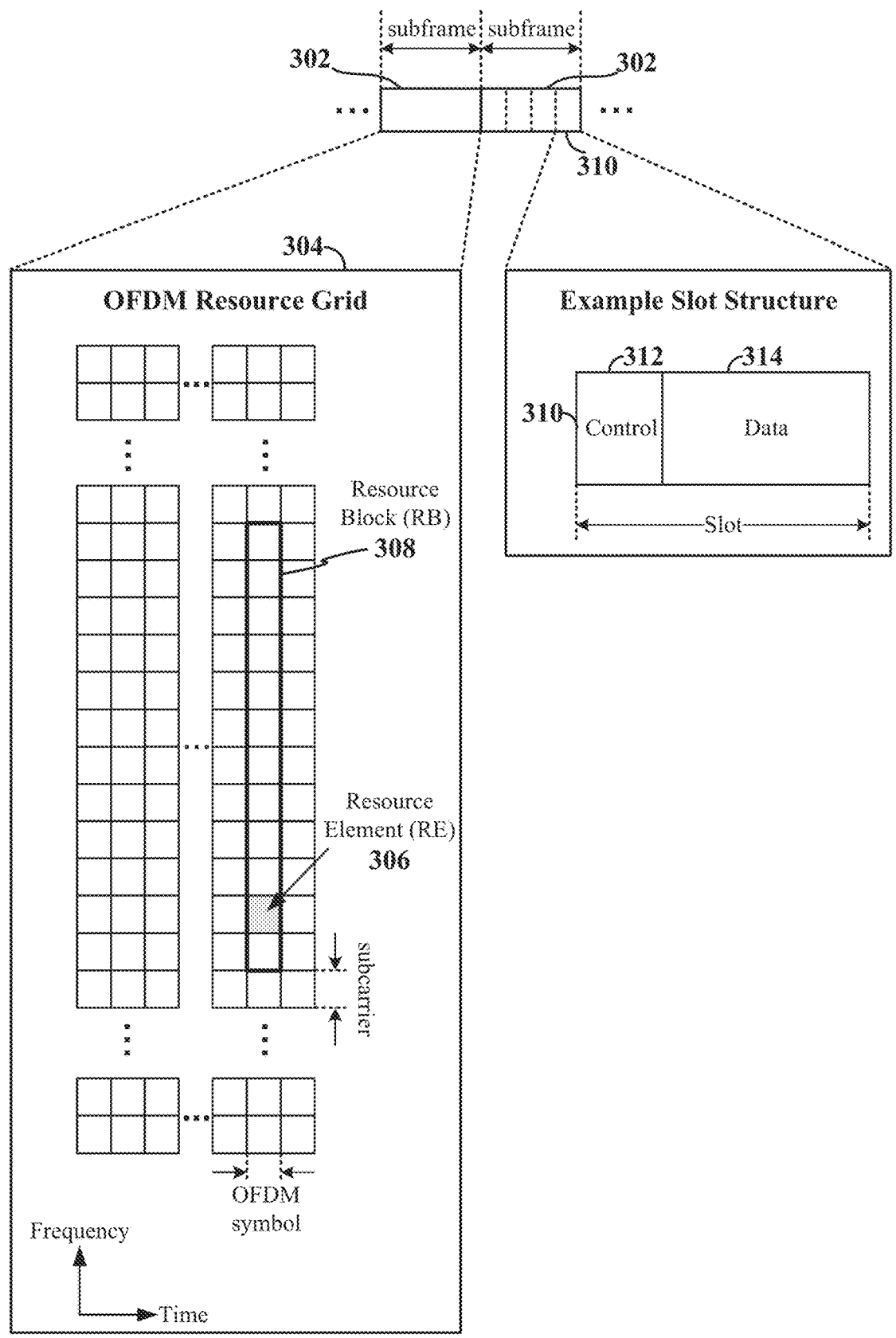
FIG. 3 is a diagram illustrating an example of a frame structure for use in a radio access network according to some aspects.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex quantity representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
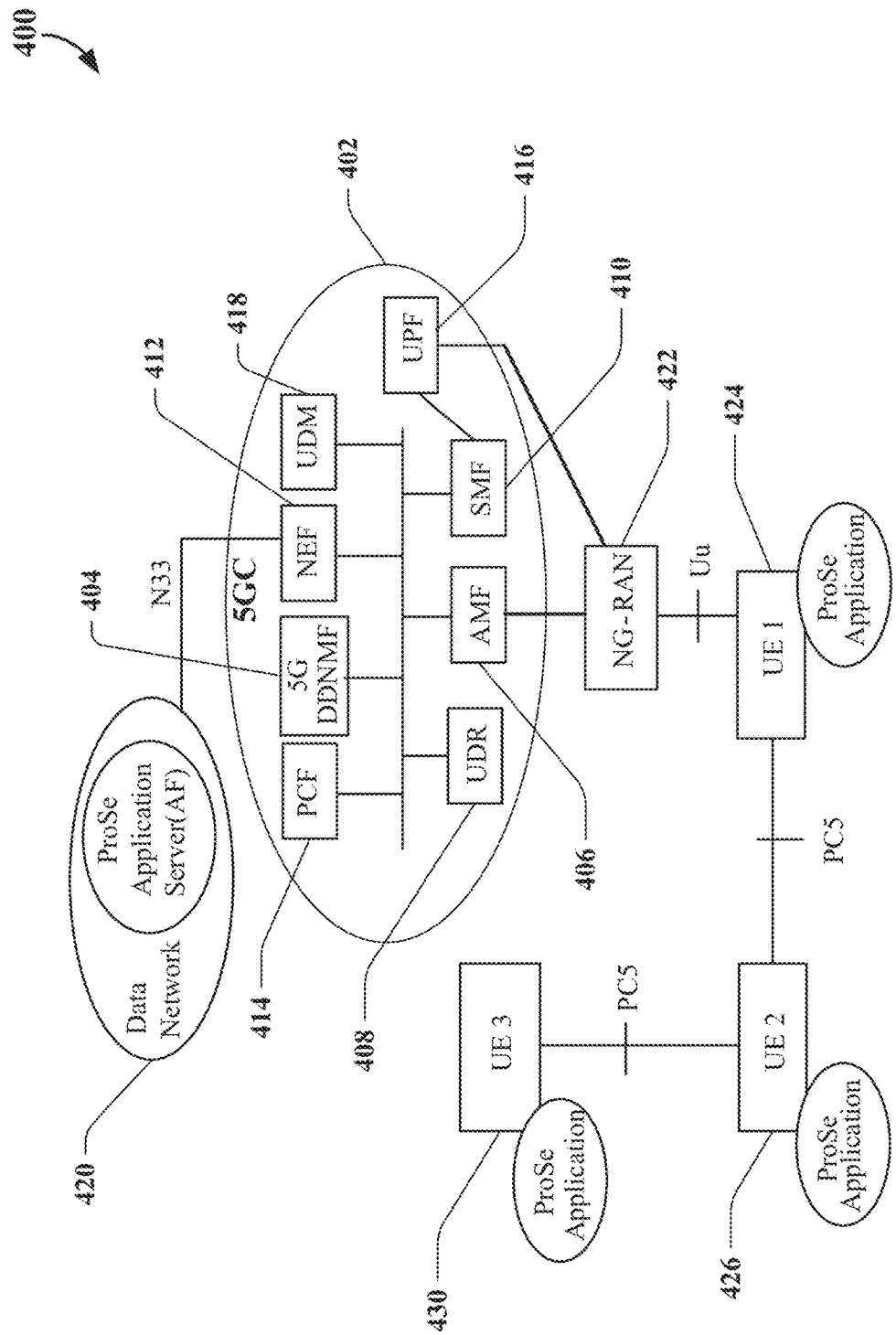
FIG. 4 illustrates an example network architecture of a network including a 5G core network (5GC) according to some aspects.

FIG. 4 illustrates an example network architecture of a network control plane 400 including a 5G core network (5GC) 402. As illustrated, the 5GC 402 may include a 5G direct discovery name management function (5G DDNMF) 404, an access and mobility management Function (AMF) 406, a user data repository (UDR) 408, a session management function (SMF) 410, a network exposure function (NEF) 412, a policy control function (PCF) 414, a user plane function (UPF) 416, and a unified data management (UDM) 418.

In some aspects, the AMF 406 supports the termination of non-access stratum (NAS) signaling, NAS ciphering and integrity protection, registration management, connection management, mobility management, access authentication and authorization, and security context management. The SMF 410 supports session management (e.g., session establishment, modification, or release), UE IP address allocation and management, Dynamic Host Configuration Protocol (DHCP) functions, the termination of NAS signaling related to session management, DL data notification, traffic steering configuration for the UPF 416 for proper traffic routing. Further, the UPF 416 supports packet routing and forwarding, packet inspection, QoS handling, acts as an external PDU session point of interconnect to a data network (DN) 420, and is an anchor point for intra-RAT and inter-RAT mobility.

The UDM 418 may be configured to generate authentication and key agreement credentials, user identification handling, access authorization, and subscription management. Moreover, the NEF 412 supports the exposure of capabilities and events, secure provision of information from an external application to the network, and translation of internal/external information, as examples.

In the example of FIG. 4, a next generation radio access network (NG-RAN) 422, which includes one or more devices such as gNBs, is functionally in communication with the UPF 416 and the AMF 406 and communicates wirelessly with various UE devices via Uu radio interfaces. In some examples, a UE 1 424 may be wirelessly linked to the NG-RAN 422 and may serve as UE-to-network (U2N) relay for other remote UEs, such as UE 2 426 via a sidelink or PC5 interface. In such case, the remote UE and the UE-to-network (U2N) relay UE receive discovery parameters and a ProSe Key management function (PKMF) address from a 5G ProSe function or a 5G DDNMF and discovery security material is received from the PKMF of the U2N relay node. In order to establish the U2N link, the remote UE sends a ProSe Remote User Key (PRUK) Request message to the PKMF of the U2N relay. In turn, the PKMF checks that the remote UE is authorised to receive UE-to-network relay service. If the Remote UE is authorised to receive the service, the PKMF sends a PRUK and PRUK ID to the remote UE. The discovery procedure is performed between the Remote UE and the U2N relay using the discovery parameters and the discovery security material.

After discovery, the Remote UE may send a Direct Communication Request that contains the PRUK ID, Relay Service Code (RSC) of the U2N relay service and a $K_{NRP}$ freshness parameter 1. The U2N relay then sends a Key Request message that contains PRUK ID, RSC and $K_{NRP}$ freshness parameter 1 to the PKMF. In response, the PKMF generates a $K_{NRP}$ freshness parameter 2 and derives $K_{NRP}$ using PRUK identified by PRUK ID, $K_{NRP}$ freshness parameter 1 and $K_{NRP}$ freshness parameter 2 and sends a Key Response message that contains the $K_{NRP}$ freshness parameter 1 and $K_{NRP}$ freshness parameter 2 to the U2N relay.

Furthermore, the U2N relay sends a Direct Security Mode Command message to the Remote UE that contains the $K_{NRP}$ Freshness Parameter 2 and is protected based on the session key ($K_{NRP-Sess}$) derived from $K_{NRP}$. The Remote UE derives $K_{NRP}$ from its PRUK, RSC, $K_{NRP}$ Freshness Parameter 1 and the received $K_{NRP}$ Freshness Parameter 2. Further, the Remote UE derives the session key ($K_{NRP-Sess}$) in the same manner as the U2N relay and processes the Direct Security Mode Command. The Remote UE then responds with a Direct Security Mode Complete message to the UE-to-network relay. Finally, the remote UE and U2N relay continue the rest of procedure for the relay service over the secure PC5 link, which is dependent on the UE-to-network relay type (i.e., L2 or L3 relay).

Of further note, the 5G DDNMF 404 has similar functions from an architecture point of view to the DDNMF part of a ProSe Function as defined in 3GPP TS 23.303. Also, the UE will use NAS messages to obtain discovery parameters for open discovery or restricted discovery.

In other aspects, a UE or similar device may serve as a UE-to-UE (U2U) relay between two other UE devices via PC5 links As an example, UE 2 426 may serve as a U2U relay between a first remote UE 1 424 and another remote UE 3 430. It is noted that in the case of end-to-end communication (e.g., UE-to-UE communication via a U2U relay), it is important to protect the security (i.e., the integrity and confidentiality) of information between the peer UEs or remote UEs (wherein peer UE and remote UE may be considered the same type of UE device) over the U2U relay. In particular, protecting the integrity and confidentiality of information exchanged between the peer UEs over the U2U Relay, which may be an untrusted network node, protects against various attacks, such as an unauthorized disclosure and the modification of information.

Figure 5:
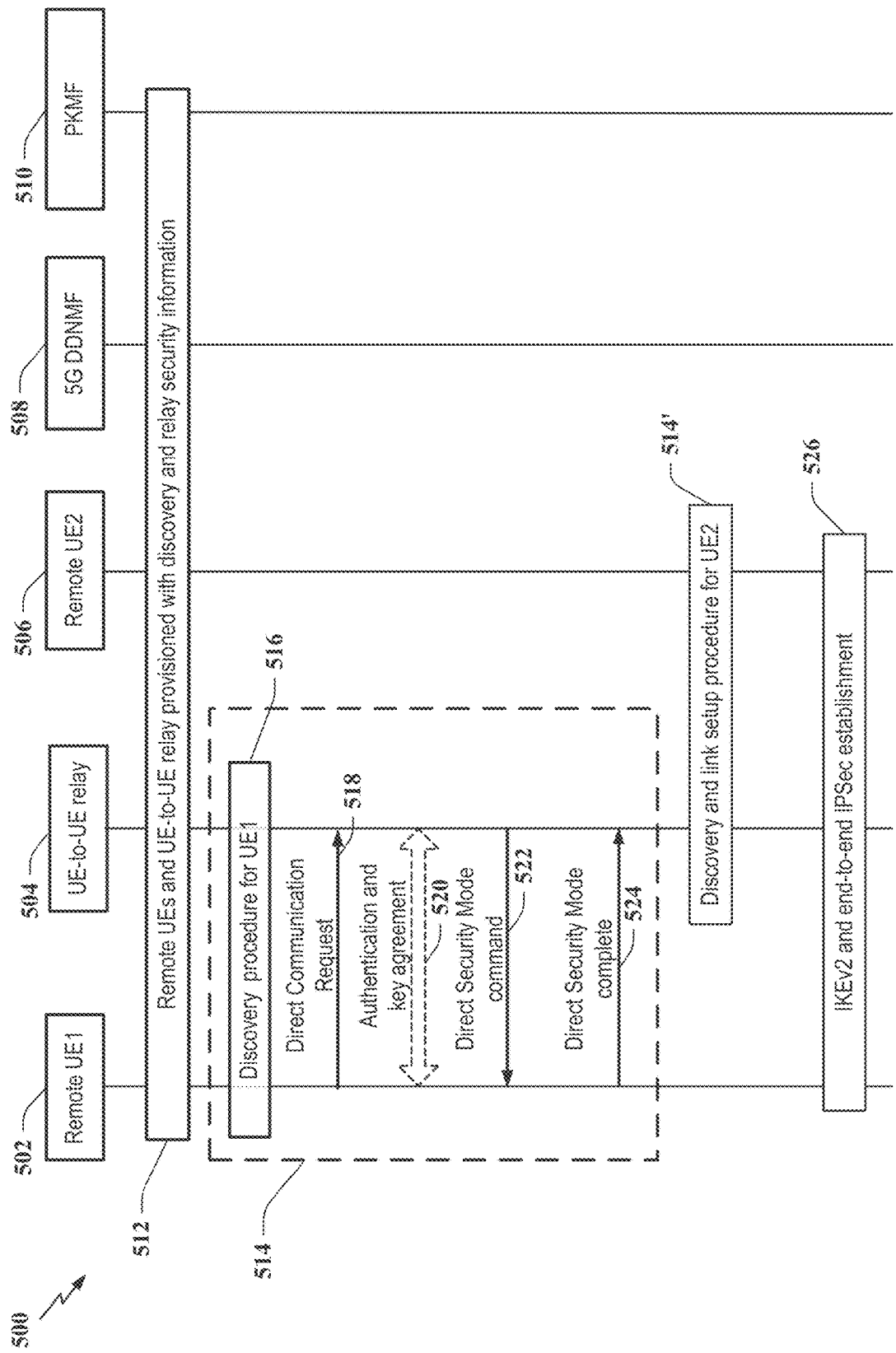
FIG. 5 illustrates a call flow diagram of an example process for implementing a UE-to-UE communication via a UE-to-UE relay according to some aspects.

FIG. 5 illustrates a call flow diagram 500 of an example method for establishing a UE-to-UE (U2U) relay connection that includes protecting the integrity and confidentiality for information exchanged between at least two remote UEs via the U2U relay. As shown, signaling occurs between a remote UE1 502, a UE-to-UE relay 504 (e.g., a UE device such as UE 426 in FIG. 4), a remote UE2 506, a 5G DDNMF 508, and a ProSe Key management function (PKMF) of the U2U relay 510.

Prior to setting up a link via the UE-to-UE relay 504, the network (e.g., 402 in FIG. 4) is configured to provision both remote UEs 502 and 506, as well as the UE-to-UE relay 504 with discovery parameters and relay security information as shown at block 512. In a particular aspect, the remote UEs 502 and 506 and the UE-to-UE (U2U) relay 504 are provisioned with the discovery parameters and a ProSe Key management function (PKMF) address from the 5G DDNMF 508, and the relay security materials are provisioned by the PKMF 510. Furthermore, the remote UEs 502 and 506 are provisioned with security materials for end-to-end security setup, by the PKMF 510. In one example, the security materials for end-to-end security setup may include a ProSe Service Code (PSC) (or an identifier associated with the end-to-end connectivity service via a U2U relay) and an associated key. The PSC may be used as a key ID when internet key exchange version two (IKEv2) pre-shared key (PSK) based authentication is being used. According to another aspect, when an IKEv2 certificate authentication is used, the PSC may be configured to then indicate which certificate(s) should be used for the authentication. For example, the PSC may be associated with one or more trusted certificate authority (CA) certificates. The PSC to CA relationship may be provisioned as part of the UE provisioning of the ProSe service of block 512.

After the provisioning in block 512, which may be performed at initialization or may also be predetermined at configuration of the system, a discovery and link process 514 may be initiated when the UE-to-UE relay link is to be set up (e.g., a PC5 unicast link). It is noted that both remote UE 502 and remote UE 506 will each execute the process 514 (shown as 514' for UE 506, which signifies the same process as 514 but performed with UE 506 instead of UE 502) with the UE-to-UE relay 504, where the process 514 is only shown in detail for UE 502 for sake of brevity and to avoid duplication of description. It is noted that the processes 514 and 514' may be performed in parallel or sequentially.

Process 514 may include a discovery procedure 516 where the remote UE (e.g., 502) performs discovery of the U2U relay 504. This discovery may be performed based, in part, on the discovery parameters provisioned in process 512. Once the remote UE (e.g., 502) discovers the U2U relay 504, the Remote UE sends a direct communication request that may include a relay service code (RSC) (or an identifier associated with the U2U relay service) and a Nonce1 value as shown at signalling 518.

In some aspects, it is noted that an authentication and key agreement process 520 may be performed between the remote UE (e.g., 502) and the U2U relay 504, although this process may be optional. In one aspect, as a result of a successful authentication, a key $K_{NRP}$ may be derived similar to the U2N process discussed earlier. In other aspects, the key $K_{NRP}$ may already be known to the remote UE. For example, key $K_{NRP}$ may be provisioned at the remote UE (e.g., 502 or 506) by the PKMF at block 512.

In response to the direct communication request 518, the U2U relay 504 may generate a Nonce2 value and, in turn, derives a key $K_{NRP\text{-}Sess}$ using the $K_{NRP}$, Nonce1, and Nonce2 values. The U2U relay 504 then sends a direct security mode command 522 containing the Nonce 2 value to the remote UE (e.g., 502). The direct security mode command 522 is integrity protected based on the $K_{NRP\text{-}Sess}$ value. In response to command 522, the remote UE may then derive the key $K_{NRP\text{-}Sess}$ using the $K_{NRP}$, Nonce1, and Nonce2 values and check the integrity of the direct security mode command 522 based thereon. If the verification is successful, the remote UE (e.g., 502) sends a direct security mode complete signal 524 to the U2U relay 504. After completion of the processes and signalling of block 514 (and 514'), the PC5 links are setup between each remote UE 502 and 506 and the U2U relay 504.

When the PC5 links are set up, the remote UE 502 and the remote UE 506 may then establish an end-to-end IPsec connection via the U2U relay 504 as shown by block 526. In order to establish this end-to-end IPsec connection, each of the remote UEs 502 and 506 may perform IKEv2 authentication. For example, the remote UEs 502 and 506 may run IKEv2 PSK authentication, wherein the ProSe Service Code (PSC) and the key provisioned at block 512 are used for the IKEv2 authentication. As another example, the remote UEs 502 and 506 may run IKEv2 certificate authentication, wherein the issuing CA certificates and/or trusted CA list may be provisioned by the PKMF 510 at the process of block 512.

Figure 6:
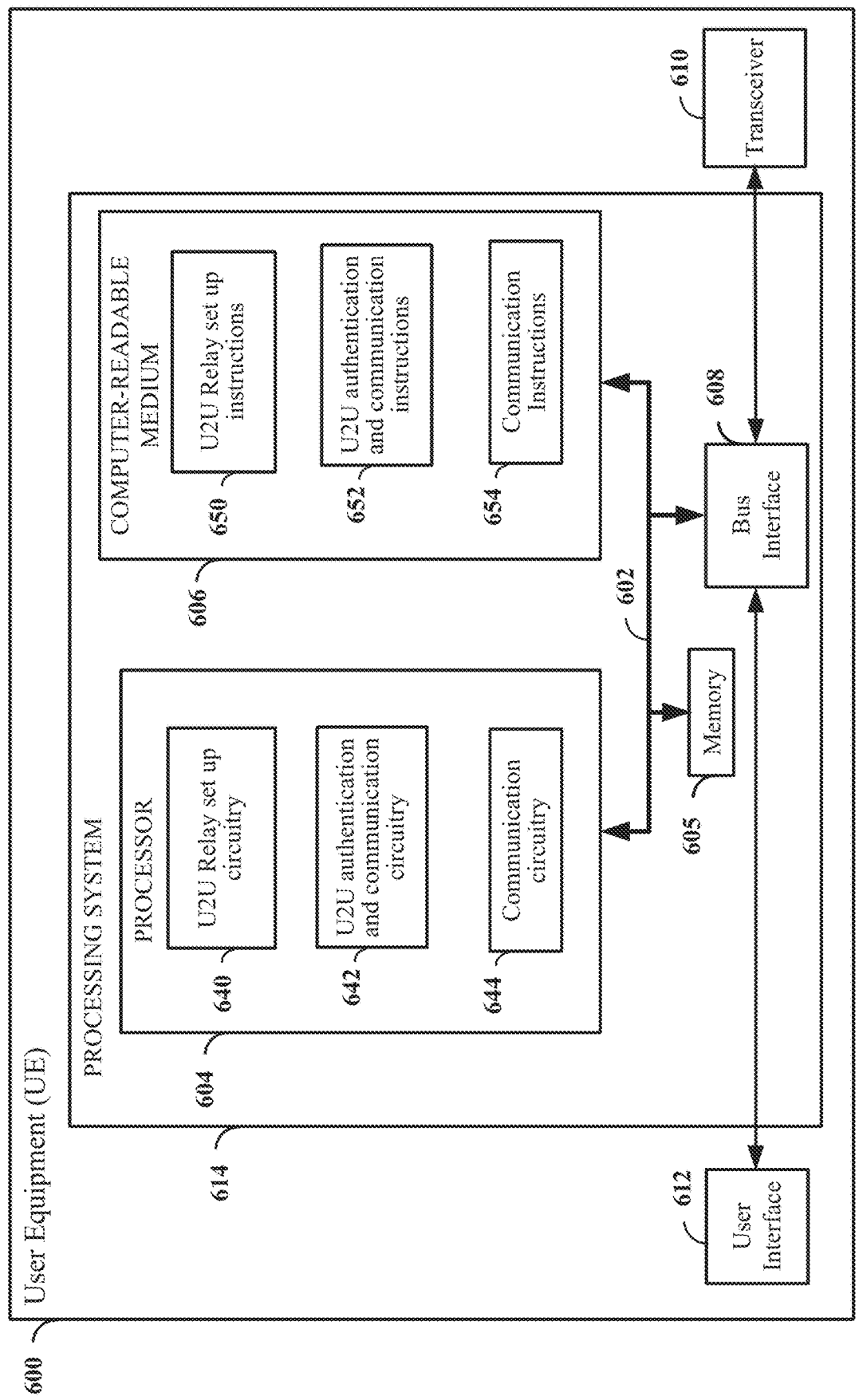
FIG. 6 is a block diagram illustrating an example of a hardware implementation for a network node or entity employing a processing system according to some aspects.

FIG. 6 is a block diagram illustrating an example of a hardware implementation for a network node 600 employing a processing system 614. For example, the network node 600 may be any of the UEs illustrated in any one or more of FIG. 1, 2, 4 or 5 (e.g., remote UEs 502 or 506).

The network node 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network node 600 may be configured to perform any one or more of the functions described herein. That is, the processor 604, as utilized in network node 600, may be used to implement any one or more of the processes described herein. The processor 604 may in some instances be implemented via a baseband or modem chip and in other implementations, the processor 604 may itself comprise a number of devices distinct and different from a baseband or modem chip (e.g., in such scenarios these components may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), and computer-readable media (represented generally by the computer-readable storage medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium (e.g., air interface). A user interface 612 (e.g., keypad, touchpad, display, speaker, microphone, etc.) may also be provided.

The processor 604 is responsible for managing the bus 602 and general processing, including the execution of software stored on the computer-readable storage medium 606. The software, when executed by the processor 604, causes the processing system 614 to perform the various functions described herein for any particular apparatus. The computer-readable storage medium 606 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 606.

The computer-readable storage medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 606 may reside in the processing system 614, external to the processing system 614, or distributed across multiple entities including the processing system 614. The computer-readable storage medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 604 may include circuitry configured for various functions. For example, the processor 604 may include UE-to-UE relay set up circuitry 640 that is configured to establish a secure connection with a user equipment to user equipment (UE-to-UE) relay device using received security information, including discovery information. In a particular aspect, the circuitry 640 may discover the UE-to-UE relay device (in cooperation with communication circuitry 644 to be discussed below) and establish a PC5 link with the UE-to-UE relay using direct security mode requests and commands as was discussed in connection with process 514 in FIG. 5, for example. In other aspects, UE-to-UE relay setup circuitry 640 may further be configured to execute UE-to-UE relay setup instructions 650 stored in the computer-readable storage medium 606 to implement any of the one or more of the functions described herein, particularly in relation to the functionalities described in connection with FIGS. 4, 5, and 7 herein.

In further aspects, it is noted that the UE-to-UE relay set up circuitry 640 may be configured as a means for establishing a secure connection with a UE-to-UE relay device. As an example, such means may be a circuitry to implement the various processes shown in block 514, as an example. In other aspects, such means may be implemented with inclusion of other processing circuitries to implement the functionality.

In some further aspects of the disclosure, the processor 604 may include a UE-to-UE (U2U) authentication and communication circuitry 642. In an aspect, U2U authentication and communication circuitry 642 is configured to establish a secure UE-to-UE communication link via a U2U relay device using security information received from or provisioned by a wireless network such as network 402, as an example. In other aspects, the U2U authentication and communication circuit 642 may be configured to perform the various authentication for establishing an IKEv2 and end-to-end IPSec communication link as was discussed in connection with block 526 of FIG. 5, for example. U2U authentication and communication circuit 642 may further be configured to execute U2U authentication and communication instructions 652 stored in the computer-readable storage medium 606 to implement any of the one or more of the functions described herein, particularly in relation to the functionalities described in connection with FIGS. 4, 5, and 7 herein.

In further aspects, it is noted that U2U authentication and communication circuitry 642 may be configured as a means for establishing a secure connection (e.g., an end-to-end communication) with at least a second UE via a U2U relay device using received security information provided or provisioned by the network. In other aspects, such means may be implemented with inclusion of other processing circuitries to implement the functionality.

In yet further aspects, the processor 604 may include a communication circuitry 644 that is configured to effect at least UE-to-UE transmit and receive with the second UE via the U2U relay device. Additionally, communication circuitry 644 may be configured to receive the security information from the network and store this information in memory 605, as an example. In other aspects, the communication circuitry 644 may work in cooperation with circuitry 640 and 642, as well as transceiver 610, for implementing the U2U relay set up and U2U authentication and set up. In further aspects, the circuitry 644 may further be configured to execute communication instructions 654 stored in the computer-readable storage medium 606 to implement any of the one or more of the functions described herein, particularly in relation to the functionalities described in connection with FIGS. 4, 5, and 7 herein.

In further aspects, communication circuitry 644 may be configured as a means for receiving the security information from the wireless communication network, where the security information includes discovery parameters and relay security information. In an aspect, such means may be configured to implement portions of the process 512 discussed previously in connection with the example of FIG. 5. In other aspects, such means may be implemented with inclusion of other processing circuitries to implement the functionality.

Figure 7:
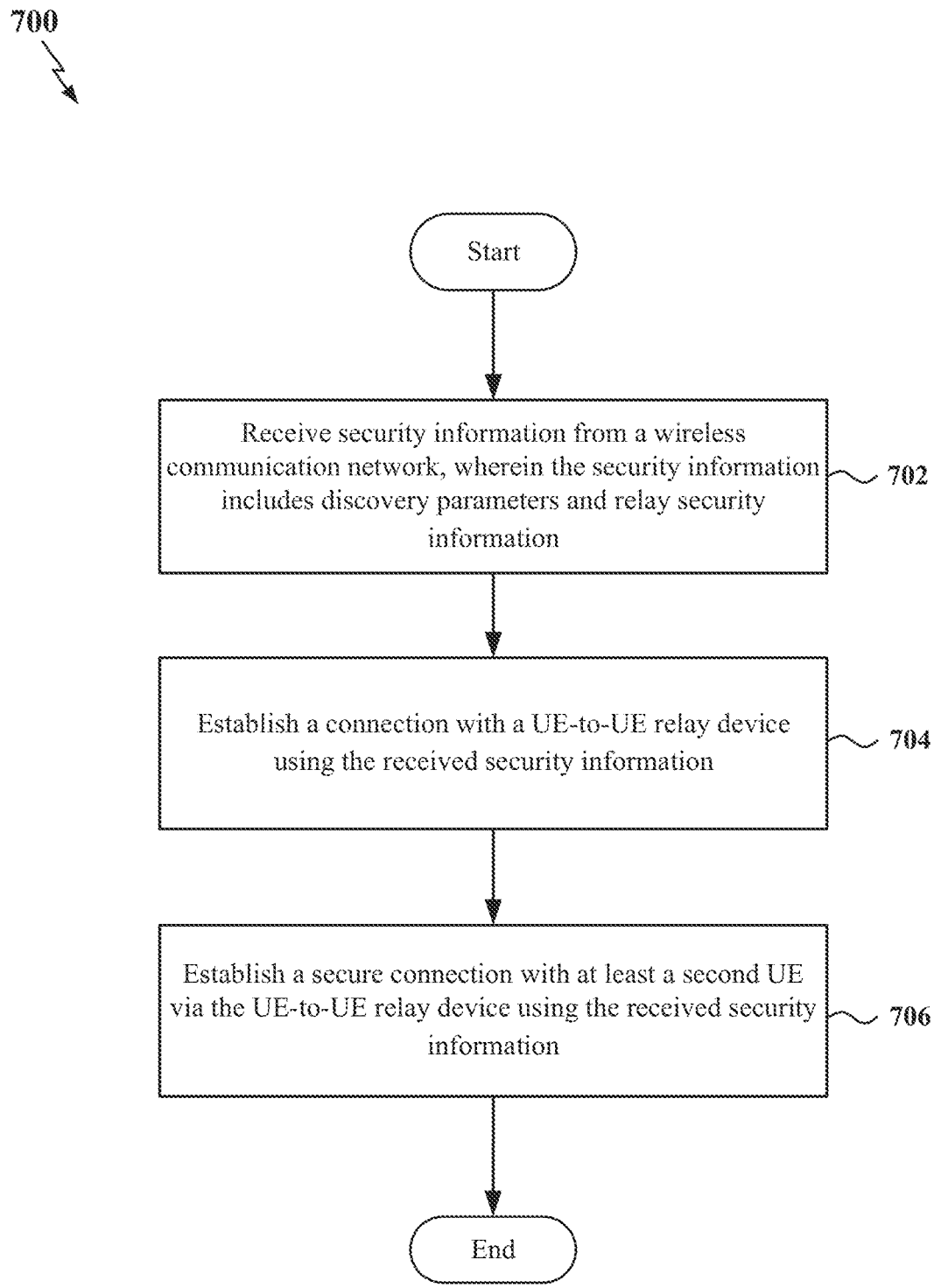
FIG. 7 is a flow chart of a method in a network node for implementing a UE-to-UE communication via a network node according to some aspects.

FIG. 7 is a flow chart of a method 700 for wireless communication in a user equipment (UE) in a wireless communication network, according to some aspects. In some examples, the method 700 may be performed by a network node or UE 600, as described above and illustrated in FIG. 6, by a processor or processing system, remote UEs 502 or 506 in FIG. 5, or by any suitable means for carrying out the described functions.

As shown in FIG. 7, method 700 includes receiving security information in a first UE from a wireless communication network, wherein the security information includes discovery parameters and relay security information as shown at block 702. It is noted that the processes of block 702 may include the processes of block 512 in FIG. 5 as one example, and may further include receiving the discovery parameters and relay security information from a 5G DDNMF (e.g., 5G DDNMF 508) and a PKMF (e.g., PKMF 510), respectively. In an aspect, the transceiver 610 and/or communication circuitry 644 shown and described above in connection with FIG. 6, or equivalents thereof, may provide means for receiving security information in a first UE from a wireless communication network, wherein the security information includes discovery parameters and relay security information.

Furthermore, method 700 may also include establishing a connection with a user equipment to user equipment (UE-to-UE) relay device using the received security information as shown in block 704. The processes of block 704 may include the processes 514 in the example of FIG. 5, as merely one example. This connection or communication link comprises a PC5 link in some examples, and may also be a secure connection as was explained in connection with FIG. 5. In an aspect, the transceiver 610 and/or U2U relay set up circuitry 640 shown and described above in connection with FIG. 6, or equivalents thereof, may provide means for establishing a connection with a user equipment to user equipment (UE-to-UE) relay device using the received security information.

After the establishment of the secure connection to the UE-to-UE relay in block 704, the UE may then establish a secure connection with at least a second UE via the UE-to-UE relay device using the received security information as shown in block 706. According to some aspects, the processes of block 706 may include the process 526 as shown in FIG. 5, as merely one example. As discussed before, the secure connection or communication link may be an IPSec end-to-end link using IKEv2. In an aspect, the transceiver 610 and/or U2U authentication and communication circuitry 642 shown and described above in connection with FIG. 6, or equivalents thereof, may provide means for establish a secure connection with at least a second UE via the UE-to-UE relay device using the received security information.

In further aspects, method 700 may include the discovery parameters being obtained from a 5G direct discovery name management function (DDNMF) implemented by the wireless communication network. Furthermore, the relay security information may be derived from a proximity-based services (ProSe) key management function (PKMF) implemented in the wireless communication network. In further aspects, the relay security information includes at least one of one or more service identifiers, one or more keys associated with each service identifier, or one or more certificates. Additionally, the one or more service identifiers comprise at least one of a ProSe Service Code (PSC) or an identifier associated with the second UE. In still other aspects, the identifier associated with the second UE may be a fully qualified domain name (FQDN), which is used for end-to-end security by a remote UE with another remote UE via the U2U relay. In yet another aspect, the service identifier is a Relay Service Code (RSC), which is used for PC5 security with the U2U relay. Method 700 also may include that the one or more service identifiers comprise a Relay Service Code (RSC). Also, the one or more certificates may be certificate authority (CA) certificates. the UE uses the PSC as a key identifier (ID) to establish the end-to-end communication using an internet key exchange (IKE) version two (IKEv2) pre-shared key (PSK) authentication process.

According to further aspects, method 700 may include the UE using the PSC to identify the one or more certificates to verify the second UE's certificate. Additionally, method 700 may include receiving an association between the one or more certificates and the PSC from the wireless communication network, and then establishing the end-to-end communication using an IKEv2 certificate authentication process based on the one or more certificates associated with the PSC.

As discussed before, it is noted that the UE-to-UE relay device may be a third user equipment (UE) configured to act as the relay. Furthermore, it is noted that the end-to-end communication utilizes a PC5 link; namely a PC5 link between each UE and the UE-to-UE relay as illustrated in FIG. 4, for example.

In yet further aspects, method 700 may include that the UE uses the discovery parameters for discovery of the UE-to-UE relay device as was discussed before in connection with process 516 in FIG. 5. Moreover, method 700 may include sending a direct communication request to the UE-to-UE relay device based on the discovery of the UE-to-UE relay device (e.g., 518 in FIG. 5), receiving a direct security mode command from the UE-to-UE relay device (e.g., 522 in FIG. 5), and establishing a direct security mode communication with the UE-to-UE relay device in response to the direct security mode command (e.g., 524 (and more generally 514) in FIG. 5). In yet further aspects, method 700 may include performing an authentication and key agreement process between the UE and UE-to-UE relay device prior to establishing the direct security mode communication (e.g., 520 in FIG. 5).

Figure 8:
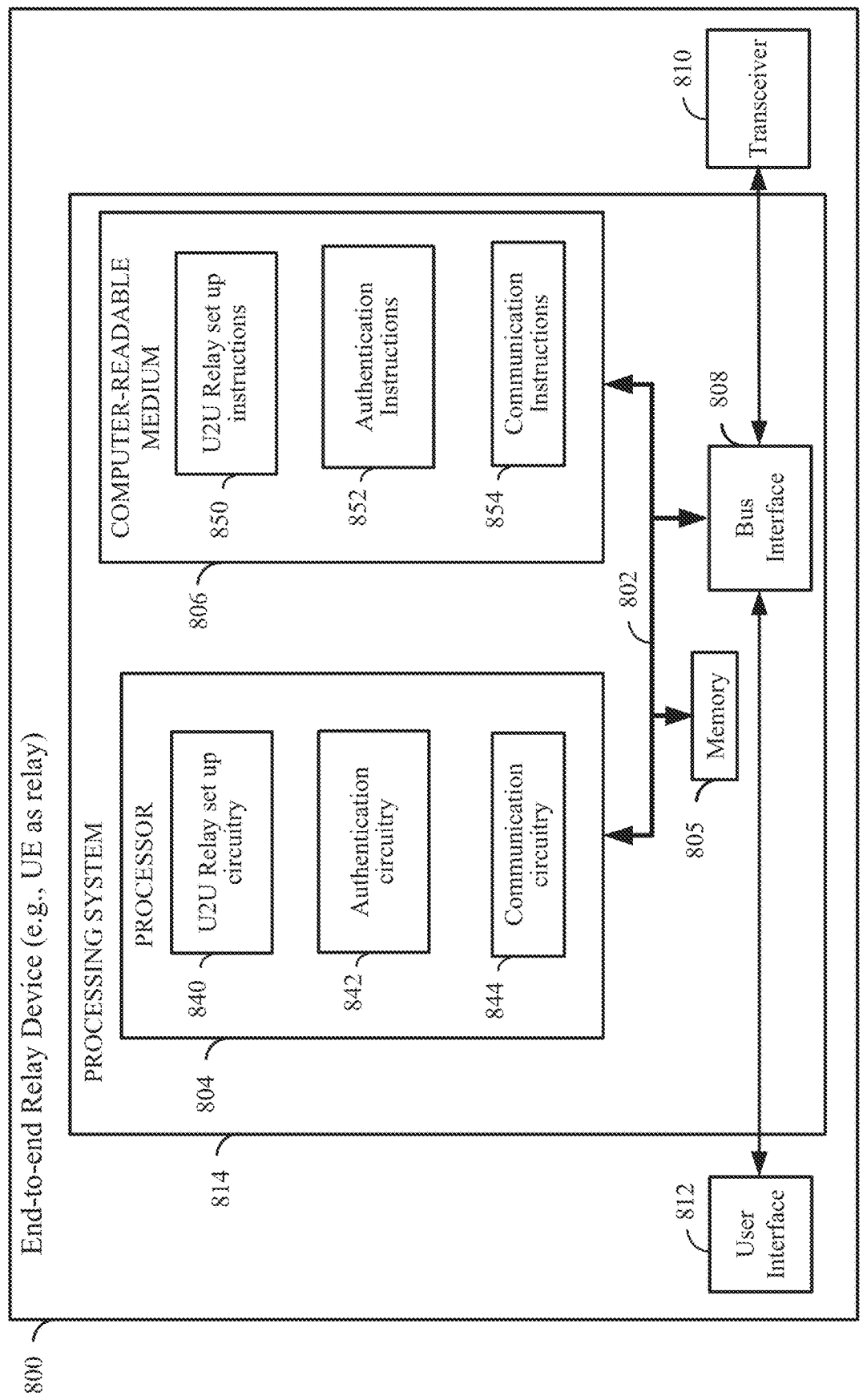
FIG. 8 is a block diagram illustrating an example of a hardware implementation for a relay device employing a processing system according to some aspects.

FIG. 8 is a block diagram illustrating an example of a hardware implementation for a relay node 800 configured to serve as an end-to-end or UE-to-UE (U2U) relay device operable in a wireless communication system. In a particular aspect, the relay node 800 may be a UE that is configured to effectuate U2U relaying between two other remote UEs, such as was illustrated by relay 504 in FIG. 5. The relay node 800 employs a processing system 814 according to some aspects. Additionally, the relay node 800 may correspond to any of the UEs shown and described above in any one or more of FIG. 1, 2, 4, or 5, for example.

In accordance with various aspects of the disclosure, an element, or any portion of an element, or any combination of elements may be implemented with a processing system 814 that includes one or more processors 804. The processing system 814 may be substantially the same as the processing system 614 illustrated in FIG. 6, including a bus interface 808, a bus 802, a processor 804, and a computer-readable storage medium 806. Furthermore, the relay node 800 may include a user interface 812 and a transceiver 810 substantially similar to those described above in FIG. 6. That is, the processor 804, as utilized in a UE 800, may be used to implement any one or more of the processes described herein.

In some aspects of the disclosure, the processor 804 may include circuitry configured for various functions. For example, the processor 804 may include a UE-to-UE (U2U) relay set up circuitry 840 for performing the functions of setting up the U2U relaying with two or more remote UEs. In a particular aspect, the circuitry 840 may establish a PC5 link with a remote UE using direct security mode requests and commands as was discussed in connection with process 514 in FIG. 5, for example. In other aspects, UE-to-UE relay setup circuitry 840 may further be configured to execute UE-to-UE relay setup instructions 850 stored in the computer-readable storage medium 806 to implement any of the one or more of the functions described herein, particularly in relation to the functionalities described in connection with FIGS. 4, 5, and 9 herein.

In further aspects, it is noted that the UE-to-UE relay set up circuitry 840 (and communication circuitry 844 to be discussed below) may be configured as a means for receiving security information from the wireless communication network, wherein the security information includes discovery parameters and relay security information. As an example, such means may be a circuitry to implement the various processes shown in blocks 512 and 514 of FIG. 5, as an example. In other aspects, such means may be implemented with inclusion of other processing circuitries to implement the functionality. Of note, while the UE-to-UE relay 800 may be provisioned with such security information, the relay 800 does not necessarily utilize or store all of this information in order to ensure secure communication between the remote UEs that utilize the UE-to-UE relay for end-to-end communication.

In other aspects, processor 804 may include an authentication circuitry 842 for performing the functions of providing authentication with remote UEs. In a particular aspect, the circuitry 842 may help establish a PC5 link with a remote UE using direct security mode requests and commands as was discussed in connection with process 520 in FIG. 5, for example. In other aspects, authentication circuitry 842 may further be configured to execute authentication instructions 852 stored in the computer-readable storage medium 806 to implement any of the one or more of the functions described herein, particularly in relation to the functionalities described in connection with FIGS. 4, 5, and 9 herein.

In yet further aspects, the processor 804 may include a communication circuitry 844 that is configured to effect at least UE-to-UE transmit and receive relaying between at least two remote UEs. In other aspects, the communication circuitry 844 may work in cooperation with circuitry 840 and 842, as well as transceiver 810, for implementing the U2U relay set up and U2U relaying. In further aspects, the circuitry 844 may further be configured to execute communication instructions 854 stored in the computer-readable storage medium 806 to implement any of the one or more of the functions described herein, particularly in relation to the functionalities described in connection with FIGS. 4, 5, and/or 9 herein.

In yet further aspects, communication circuitry 844 may also effectuate a means for establishing secure communication links with at least a first user equipment (UE) and a second UE based on the received security information. In particular, such means may be implemented to help or facilitate the end-to-end communication between two remote UEs (e.g., link processes 526 in FIG. 5). In other aspects, such means may be implemented with inclusion of other processing circuitries to implement the functionality.

Figure 9:
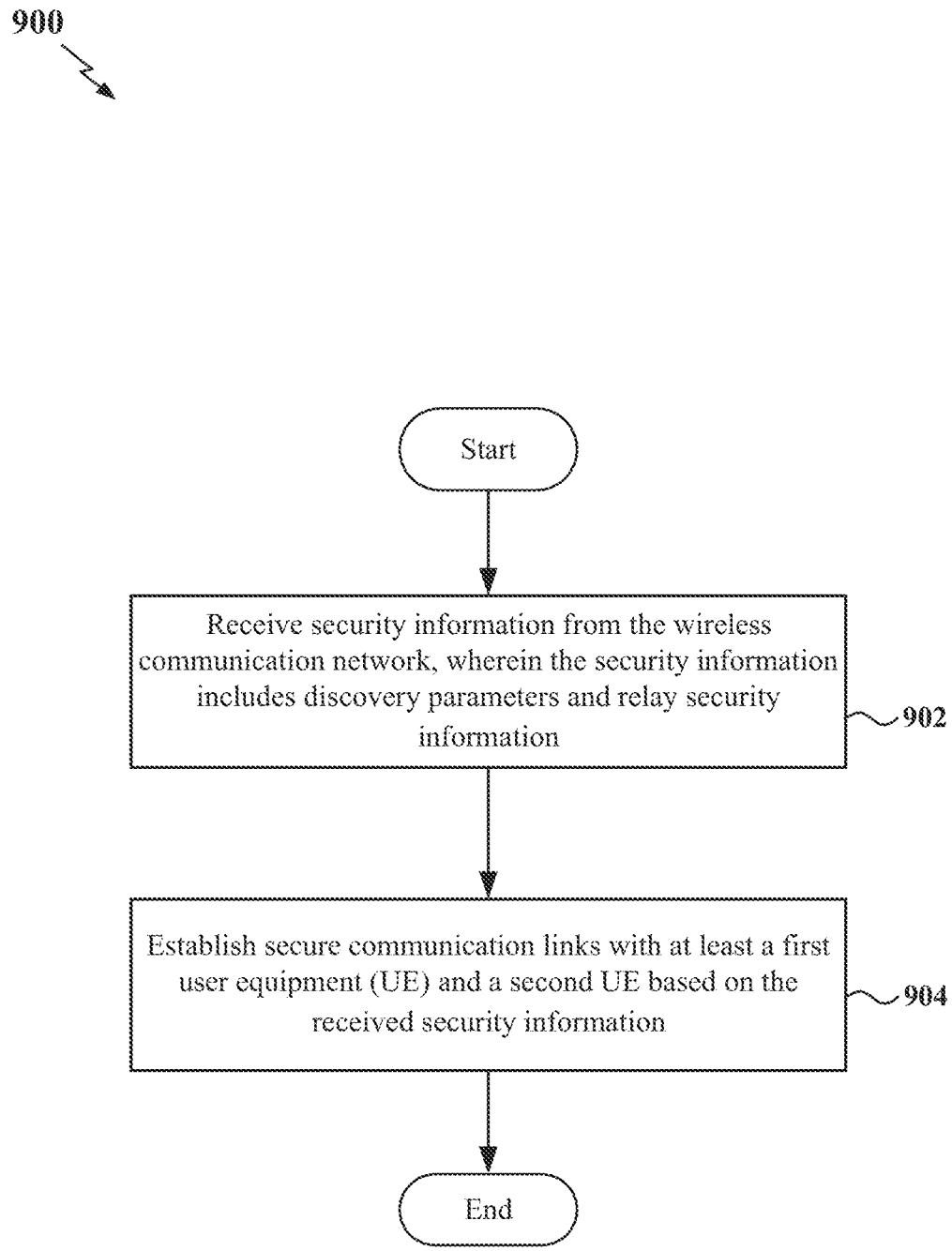
FIG. 9 is a flow chart of a method for implementing a UE-to-UE communication via a network node according to some aspects.

FIG. 9 is a flow chart of a method 900 for wireless communication in a U2U relay device in a wireless communication network according to some aspects. In some examples, the method 900 may be performed by the UE-to-UE relay node 800, as described above and illustrated in FIG. 8, by a UE such as UE 426 in FIG. 4, relay 504 in FIG. 5, by a processor or processing system, or by any suitable means for carrying out the described functions.

In a block 902, method 900 includes receiving security information from the wireless communication network, wherein the security information includes discovery parameters and relay security information. Furthermore, method 900 includes establishing, with the UE-to-UE relay, secure communication links between at least a first user equipment (UE) and a second UE based on the received security information as shown in block 904. It is noted that while the UE-to-UE relay does not have authentication to be able to receive/decode signaling occurring between the first and second UEs that are being relayed, the processes of blocks 512 and 514 in FIG. 5, for example, include that the relay is provisioned with the discovery and security information such that the first and second UEs may establish PC5 links thereto to be able to establish the end-to-end IPSec communication link between the first and second UEs, such as was described in connection with process 514 in FIG. 5

In further aspects, method 900 may include the discovery parameters being derived from a 5G direct discovery name management function (DDNMF) implemented by the wireless communication network. Further, the relay security information may be obtained from a proximity-based services (ProSe) key management function (PKMF) implemented in the wireless communication network. In yet further aspects, the relay security information may also include a service identifier and an associated key. In one example, the service identifier is one of a ProSe Service Code (PSC) or an identifier associated with a service between the first and the second UEs (i.e., the service is the end-to-end communication between the first and second UE via the U2U relay). In further aspects, the identifier associated with the service between the first and second UEs may be a fully qualified domain name (FQDN), where the FQDN the U2U relay may assist or help the first and second UEs to find each other and also set up the end-to-end security.

In yet further aspects, the service identifier may be a relay service code (RSC), which is for PC5 link security with each of the remote UEs (i.e., the first and second UEs). It is noted again that the UE-to-UE relay helps establish end-to-end security between remote UEs. The UE-to-UE relay may use a PSC or service identifier to connect the first and second remote UEs, but does not know the associated keys, thus affording secure communication between the remote UEs.

In further aspects, it is noted that the UE-to-UE relay may be a third user equipment (UE) as was previously discussed. Additionally, the secure communication links utilize PC5 links between the UE-to-UE relay and the first and second UEs.

In yet further examples, method 900 may include receiving a direct communication request from at least one UE of the first and second UEs, sending a direct security mode command to the at least one UE, receiving a direct security mode completion message from the at least one UE, and then establishing a direct security mode communication with the at least one UE device as was discussed before in connection with process 514. In further examples, this process may include performing an authentication and key agreement process between the UE and the UE-to-UE relay prior to establishing the direct security mode communication.

Figure 10:
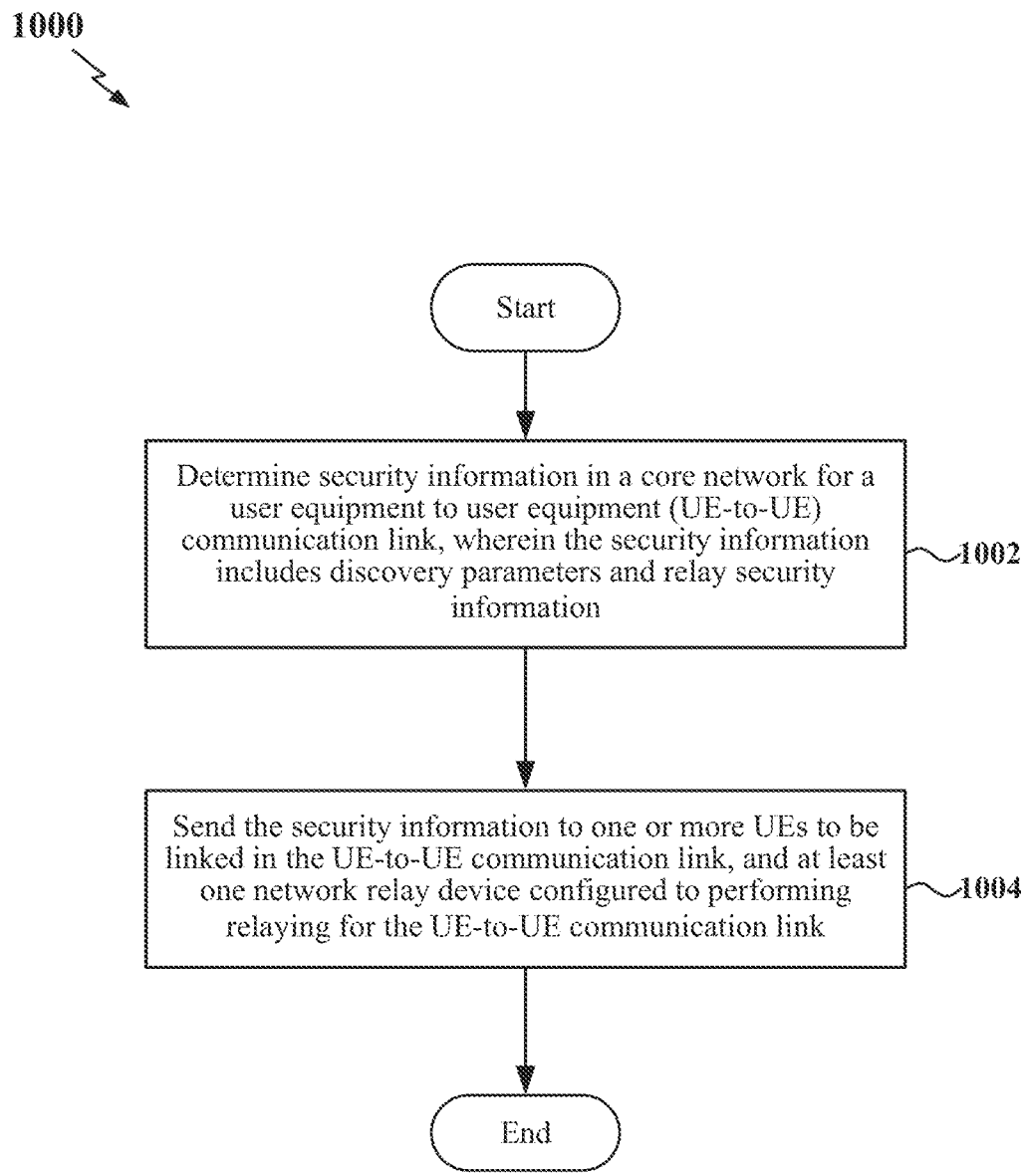
FIG. 10 is another flow chart of a method for implementing a UE-to-UE communication via a network according to some further aspects.

FIG. 10 is a flow chart of a method 1000 for wireless communication in a wireless communication network according to some aspects. In some examples, the method 1000 may be performed by the network such as 5GC 402 in FIG. 4, along with NG-RAN 422, as examples. by 5G DDNMF 508 and PKMF 510 in FIG. 5, or by a processor or processing system in a 5GC, or by any suitable means for carrying out the described functions.

Method 1000 includes determining security information in a core network for a user equipment to user equipment (UE-to-UE) communication link, wherein the security information includes discovery parameters and relay security information as shown in block 1002. Furthermore, method 1000 includes sending or provisioning the security information to one or more UEs to be linked in the UE-to-UE communication link, and at least one network relay device configured to performing relaying for the UE-to-UE communication link as shown in block 1004. In an aspect, blocks 1002 and 1004 may be implemented by a 5G DDNMF and a PKMF such as functions 508 and 510 in FIG. 5, or 5G DDNMF 404 and ProSe AF 428 in FIG. 4, as merely a couple of examples.

Furthermore, method 1000 may include the discovery parameters being determined with a 5G direct discovery name management function (DDNMF) implemented by the wireless communication network. In other aspects, the relay security information may be determined by a proximity-based services (ProSe) key management function (PKMF) implemented in the wireless communication network. Yet further, the relay security information may include at least one of one or more service identifiers, one or more keys associated with each service identifier, or one or more certificates. Additionally, the one or more service identifiers may include at least one of a ProSe Service Code (PSC) or an identifier associated with a remote UE.

In yet other aspects, method 1000 may include that the identifier associated with a remote UE is a fully qualified domain name (FQDN). Additionally, the one or more service identifiers may comprise a Relay Service Code (RSC). In yet other aspects, the one or more certificates may be certificate authority (CA) certificates.

Several aspects of a wireless communication network have been presented with reference to one or more exemplary implementations. As those skilled in the art will readily appreciate, various aspects described throughout this disclosure may be extended to other telecommunication systems, network architectures and communication standards.

The following provides an overview of aspects of the present disclosure:

Aspect 1: A method for wireless communication at a user equipment (UE) in a wireless communication network, comprising: receiving security information from the wireless communication network, wherein the security information includes discovery parameters and relay security information; establishing a connection with a user equipment to a user equipment (UE-to-UE) relay device using the received security information; and establishing a secure connection with at least a second UE via the UE-to-UE relay device using the received security information.

Aspect 2: The method of aspect 1, wherein the discovery parameters are obtained from a 5G direct discovery name management function (DDNMF) implemented by the wireless communication network.

Aspect 3: The method of either of aspects 1 or 2, wherein the relay security information is derived from a proximity-based services (ProSe) key management function (PKMF) implemented in the wireless communication network.

Aspect 4: The method of any of aspects 1 through 3, wherein the relay security information further comprises at least one of one or more service identifiers, one or more keys associated with each service identifier, or one or more certificates.

Aspect 5: The method of any of aspects 1 through 4, wherein the one or more service identifiers comprise at least one of a ProSe Service Code (PSC) or an identifier associated with the second UE.

Aspect 6: The method of aspect 5, wherein the identifier associated with the second UE is a Fully Qualified Domain Name (FQDN).

Aspect 7: The method of aspect 5, wherein the UE uses the PSC as a key identifier (ID) to establish the end-to-end communication using an internet key exchange (IKE) version two (IKEv2) pre-shared key (PSK) authentication process.

Aspect 8: The method of aspect 5, wherein the UE uses the PSC to identify the one or more certificates to verify a certificate of the second UE.

Aspect 9: The method of any of aspects 1 through 8, further comprising: receiving an association between the one or more certificates and the PSC from the wireless communication network; and establishing the secure connection between the UE and the second UE using an IKEv2 certificate authentication process based on the one or more certificates associated with the PSC.

Aspect 10: The method of any of aspects 4 through 9, wherein the one or more service identifiers are a Relay Service Code (RSC).

Aspect 11: The method of any of aspects 4 through 10, wherein the one or more certificates are certificate authority (CA) certificates.

Aspect 12: The method of any of aspects 1 through 11, wherein the UE-to-UE relay device comprises a third user equipment (UE).

Aspects 13 The method of any of aspects 1 through 12, wherein the connection between the UE and the UE-to-UE relay device is a secure connection utilizing a PC5 link Aspect 14: The method of any of aspects 1 through 13, wherein the UE uses the discovery parameters for discovery of the UE-to-UE relay device.

Aspect 15: The method of any of aspects 1 through 14, further comprising: sending a direct communication request to the UE-to-UE relay device based on the discovery of the UE-to-UE relay device; receiving a direct security mode command from the UE-to-UE relay device; and establishing a direct security mode communication with the UE-to-UE relay device in response to the direct security mode command.

Aspect 16: The method of any of aspects 1 through 15, further comprising: performing an authentication and key agreement process between the UE and UE-to-UE relay device prior to establishing the direct security mode communication.

Aspect 17: A user equipment (UE) in a wireless communication system, comprising: a wireless transceiver; a memory; and a processor communicatively coupled to the wireless transceiver and the memory, wherein the processor and the memory are configured to: receive security information from the wireless communication network, wherein the security information includes discovery parameters and relay security information; establish a connection with a user equipment to user equipment (UE-to-UE) relay device using the received security information; and establish a secure connection with at least a second UE via the UE-to-UE relay device using the received security information.

Aspect 18: A method for wireless communication in a user equipment (UE) to UE (UE-to-UE) relay in a wireless communication network, comprising: receiving security information from the wireless communication network, wherein the security information includes discovery parameters and relay security information; and establishing secure communication links with at least a first user equipment (UE) and a second UE based on the received security information.

Aspect 19: The method of aspect 18, wherein the discovery parameters are derived from a 5G direct discovery name management function (DDNMF) implemented by the wireless communication network.

Aspect 20: The method of either of aspect 18 or aspect 19, wherein the relay security information is obtained from a proximity-based services (ProSe) key management function (PKMF) implemented in the wireless communication network.

Aspect 21: The method of any of aspects 18 through 20, wherein the relay security information further comprises a service identifier and an associated key.

Aspect 22: The method of any of aspects 18 through 21, wherein the service identifier is one of a ProSe Service Code (PSC) or an identifier associated with a service between the first and the second UEs.

Aspect 23: The method of aspect 22, wherein the identifier associated with the service between the first and second UEs comprises a Fully Qualified Domain Name (FQDN).

Aspect 24: The method of aspect 22 or aspect 23, wherein the service identifier is a relay service code (RSC).

Aspect 25: The method of any of aspects 18 through 24, wherein the UE-to-UE relay comprises a third user equipment (UE).

Aspect 26: The method of any of aspects 18 through 25, wherein the secure communication links utilize PC5 links between the UE-to-UE relay and the first and second UEs.

Aspect 27: The method of any of aspects 18 through 26, further comprising: receiving a direct communication request from at least one UE of the first and second UEs; sending a direct security mode command to the at least one UE; receiving a direct security mode completion message from the at least one UE; and establishing a direct security mode communication with the at least one UE device.

Aspect 28: The method of any of aspects 18 through 27, further comprising: performing an authentication and key agreement process between the UE and the UE-to-UE relay prior to establishing the direct security mode communication.

Aspect 29: A UE-to-UE relay in a wireless communication system, comprising: a wireless transceiver; a memory; and a processor communicatively coupled to the wireless transceiver and the memory, wherein the processor and the memory are configured to: receive security information from the wireless communication network, wherein the security information includes discovery parameters and relay security information; and establish secure communication links with at least a first user equipment (UE) and a second UE based on the received security information.

Aspect 30: The UE-to-UE relay of aspect 29, wherein the processor and the memory are configured to: receive a direct communication request from at least one UE of the first and second UEs; send a direct security mode command to the at least one UE; receive a direct security mode completion message from the at least one UE; and establish a direct security mode communication with the at least one UE device.

Aspect 31: An apparatus configured for wireless communication comprising at least one means for performing a method of any one of aspects 1 through 16 or aspects 18 through 28.

Aspect 32: A non-transitory computer-readable medium storing computer-executable code, comprising code for causing an apparatus to perform a method of any one of aspects 1 through 16 or aspects 18 through 28.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature, or function or embodied in several components, steps, or functions. Additional stages, components, steps, and/or functions may also be added without departing from novel features disclosed herein. The apparatus, devices, and/or components illustrated in FIGS. 1-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present stages of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to a stage in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the stages of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a first user equipment (UE) in a wireless communication network, comprising:
receiving discovery parameters for discovery of a user equipment (UE-to-UE) relay device and a proximity-based services (ProSe) key management function (PKMF) address from a direct discovery name management function (DDNMF) implemented by the wireless communication network;
receiving, from the PKMF, relay security information for establishment of a first secure connection between the first UE and the UE-to-UE relay device, the relay security information including a relay service code (RSC);
receiving, from the PKMF, second security information for establishment of a second secure connection between the first UE and a second UE via the UE-to-UE relay device, the second security information including a ProSe Service Code (PSC);
discovering the UE-to-UE relay device using the received discovery parameters;
establishing the first secure connection with the UE-to-UE relay device using the received relay security information including the RSC, the first secure connection comprising a first PC5 link between the first UE and the UE-to-UE-relay device; and
establishing the second secure connection between the first UE and the second UE via the UE-to-UE relay device using an internet key exchange (IKE) version two (IKEv2) authentication process based on the received second security information including the PSC, the second secure connection being established via the first PC5 link between the first UE and the UE-to-UE-relay device and a second PC5 link between the second UE and the UE-to-UE-relay device.

2. The method of claim 1, wherein the relay security information further comprises at least one of one or more service identifiers, one or more keys associated with each service identifier, or one or more certificates.

3. The method of claim 2, wherein the one or more service identifiers comprise an identifier associated with the second UE.

4. The method of claim 3, wherein the identifier associated with the second UE is a Fully Qualified Domain Name (FQDN).

5. The method of claim 1, wherein the first UE uses the PSC as a key identifier (ID) to establish the second secure connection using an IKEv2 pre-shared key (PSK) authentication process.

6. The method of claim 2, wherein the first UE uses the PSC to identify the one or more certificates to verify a certificate of the second UE.

7. The method of claim 2, further comprising:
receiving an association between the one or more certificates and the PSC from the wireless communication network; and
establishing the second secure connection between the first UE and the second UE using an IKEv2 certificate authentication process based on the one or more certificates associated with the PSC.

8. The method of claim 2, wherein the one or more service identifiers comprises the RCS.

9. The method of claim 2, wherein the one or more certificates are certificate authority (CA) certificates.

10. The method of claim 1, wherein the UE-to-UE relay device comprises a third user equipment (UE).

11. The method of claim 1, further comprising:
sending a direct communication request to the UE-to-UE relay device based on the discovery of the UE-to-UE relay device;
receiving a direct security mode command from the UE-to-UE relay device; and
establishing a direct security mode communication with the UE-to-UE relay device in response to the direct security mode command.

12. The method of claim 11, further comprising:
performing an authentication and key agreement process between the first UE and UE-to-UE relay device prior to establishing the direct security mode communication.

13. A first user equipment (UE), comprising:
a wireless transceiver;
a memory storing executable code; and
one or more processors configured to execute the executable code to cause the first UE to:
receive discovery parameters for discovery of a user equipment (UE-to-UE) relay device and a proximity-based services (ProSe) key management function (PKMF) address from a direct discovery name management function (DDNMF) implemented by a wireless communication network;
receive, from the PKMF, relay security information for establishment of a first secure connection between the first UE and the UE-to-UE relay device, the relay security information including a relay service code (RSC);
receive, from the PKMF, second security information for establishment of a second secure connection between the first UE and a second UE via the UE-to-UE relay device, the second security information including a ProSe Service Code (PSC);
discover the UE-to-UE relay device using the received discovery parameters;
establish the first secure connection with the UE-to-UE relay device using the received relay security information including the RSC, the first secure connection comprising a first PC5 link between the first UE and the UE-to-UE-relay device; and
establish the second secure connection between the first UE and the second UE via the UE-to-UE relay device using an internet key exchange (IKE) version two (IKEv2) authentication process based on the received second security information including the PSC, the second secure connection being established via the first PC5 link between the first UE and the UE-to-UE-relay device and a second PC5 link between the second UE and the UE-to-UE-relay device.

14. A method for wireless communication in a user equipment (UE) to UE (UE-to-UE) relay in a wireless communication network, comprising:
receiving discovery parameters and a proximity-based services (ProSe) key management function (PKMF) address from a direct discovery name management function (DDNMF) implemented by the wireless communication network;
receiving, from the PKMF, relay security information for establishment of a first secure connection between a first UE and the UE-to-UE relay and a second secure connection between a second UE and the UE-to-UE relay, the relay security information including a relay service code (RSC);

receiving, from the PKMF, second security information for establishment of a third secure connection between the first UE and the second UE via the UE-to-UE relay, the second security information including a ProSe Service Code (PSC);

establishing the first secure connection between the first UE and the UE-to-UE-relay based on the received relay security information including the RSC, the first secure connection comprising a first PC5 link between the first UE and the UE-to-UE-relay;

establishing the second secure connection between the second UE and the UE-to-UE-relay device based on the received relay security information including the RSC, the second secure connection comprising a second PC5 link between the second UE and the UE-to-UE-relay; and establishing a third secure connection between the first UE and the second UE based on the received second security information including the PSC, the third secure connection being via the first PC5 link between the first UE and the UE-to-UE-relay and the second PC5 link between the second UE and the UE-to-UE-relay-device.

15. The method of claim 14, wherein the relay security information further comprises a service identifier and an associated key.

16. The method of claim 15, wherein the service identifier is an identifier associated with a service between the first UE and the second UE.

17. The method of claim 16, wherein the identifier associated with the service between the first UE and the second UE comprises a Fully Qualified Domain Name (FQDN).

18. The method of claim 15, wherein the service identifier is comprises the RSC.

19. The method of claim 14, wherein the UE-to-UE relay comprises a third user equipment (UE).

20. The method of claim 14, further comprising:
receiving a direct communication request from at least one UE of the first UE and the second UE;
sending a direct security mode command to the at least one UE;
receiving a direct security mode completion message from the at least one UE; and
establishing a direct security mode communication with the at least one UE.

21. The method of claim 20, further comprising:
performing an authentication and key agreement process between the at least one UE and the UE-to-UE relay prior to establishing the direct security mode communication.

22. A user equipment (UE) to UE (UE-to-UE) relay, comprising:
a wireless transceiver;
a memory storing executable code; and
one or more processors configured to execute the executable code to cause the UE-to-UE relay to:
receive discovery parameters and a proximity-based services (ProSe) key management function (PKMF) address from a direct discovery name management function (DDNMF) implemented by a wireless communication network;
receive, from the PKMF, relay security information for establishment of a first secure connection between a first UE and the UE-to-UE relay and a second secure connection between a second UE and the UE-to-UE relay, the relay security information including a relay service code (RSC);
receive, from the PKMF, second security information for establishment of a third secure connection between the first UE and the second UE via the UE-to-UE relay, the second security information including a ProSe Service Code (PSC);
establish the first secure connection between the first UE and the UE-to-UE-relay based on the received relay security information including the RSC, the first secure connection comprising a first PC5 link between the first UE and the UE-to-UE-relay;
establish the second secure connection between the second UE and the UE-to-UE-relay device based on the received relay security information including the RSC, the second secure connection comprising a second PC5 link between the second UE and the UE-to-UE-relay; and
establish a third secure connection between the first UE and the second UE based on the received second security information including the PSC, the third secure connection being via the first PC5 link between the first UE and the UE-to-UE-relay and the second PC5 link between the second UE and the UE-to-UE-relay.

23. The UE-to-UE relay of claim 22, wherein the one or more processors are configured to execute the executable code to cause the UE-to-UE relay to:
receive a direct communication request from at least one UE of the first UE and the second UE;
send a direct security mode command to the at least one UE;
receive a direct security mode completion message from the at least one UE; and
establish a direct security mode communication with the at least one UE.

* * * * *